United States Patent
Kaeb et al.

(10) Patent No.: US 8,678,422 B2
(45) Date of Patent: Mar. 25, 2014

(54) ADJUSTABLE HITCH DEVICE

(75) Inventors: Terry N. Kaeb, Hoopeston, IL (US); Steven R. Walder, Hoopeston, IL (US)

(73) Assignee: KSi Conveyors, Inc., Sabetha, KS (US)

( * ) Notice: Subject to any disclaimer, the term of this patent is extended or adjusted under 35 U.S.C. 154(b) by 82 days.

(21) Appl. No.: 13/324,772

(22) Filed: Dec. 13, 2011

(65) Prior Publication Data

US 2012/0146314 A1  Jun. 14, 2012

Related U.S. Application Data

(60) Provisional application No. 61/459,557, filed on Dec. 14, 2010.

(51) Int. Cl.
*A01B 59/00* (2006.01)
*B60D 1/46* (2006.01)

(52) U.S. Cl.
USPC ......... 280/490.1; 280/462; 280/463; 280/474

(58) Field of Classification Search
USPC ............. 280/455.1, 456.1, 460.1, 461.1, 462, 280/463, 474, 478.1, 490.1, 491.1, 491.3, 280/492
See application file for complete search history.

(56) References Cited

U.S. PATENT DOCUMENTS

| 4,434,888 A | 3/1984 | Divoux et al. |
| 4,530,429 A | 7/1985 | Erickson |
| 5,601,181 A | 2/1997 | Lindhorst |
| 5,846,120 A | 12/1998 | Barton, Jr. |
| 6,068,103 A | 5/2000 | Werner |
| 6,422,381 B1 | 7/2002 | Eberlc et al. |
| 6,488,140 B2 | 12/2002 | Eberle et al. |
| 6,966,506 B2 | 11/2005 | McLeod et al. |
| 6,979,152 B2 | 12/2005 | Bodie et al. |
| 7,011,328 B2 | 3/2006 | Rogers et al. |
| 7,134,829 B2 | 11/2006 | Quenzi et al. |
| 7,677,588 B2 | 3/2010 | Coers et al. |

OTHER PUBLICATIONS

Website, Brandt Industries—Agricultural Products, Harvest Grainbelts20 Series, description and specifications httn://agricultural-products.brandt.ca/products.php?f_action=prod_detail&f_product id=15, Printed Nov. 21, 2011.

*Primary Examiner* — Kevin Hurley
*Assistant Examiner* — Marc A Scharich
(74) *Attorney, Agent, or Firm* — Bradley S. Strahm; Daniel J Coughlin

(57) ABSTRACT

An adjustable hitch device for coupling a towing vehicle to a towed implement or trailer is adapted for changing the coupling angle between the vehicle and the implement and also for changing the elevation angle of the implement. An elongated, rigid link is pivotally coupled at a first end to a hitch mechanism coupled to the vehicle and at a second, opposed end to a forward portion of the implement. An intermediate portion of the link is pivotally coupled to one end of a hydraulic cylinder, while a second, opposed end of the hydraulic cylinder is coupled to a forward portion of the implement. Extension of the cylinder lowers the implement's forward portion and raises its aft portion, while retraction of the cylinder has an opposite effect. In this manner, the height of the implement may be increased for use in operation or may be lowered for transport or storage.

10 Claims, 9 Drawing Sheets

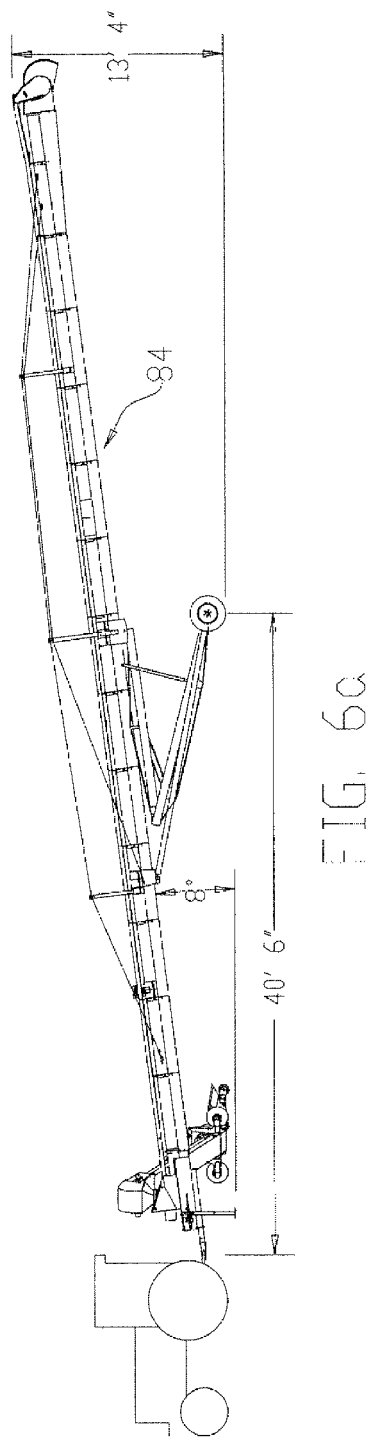

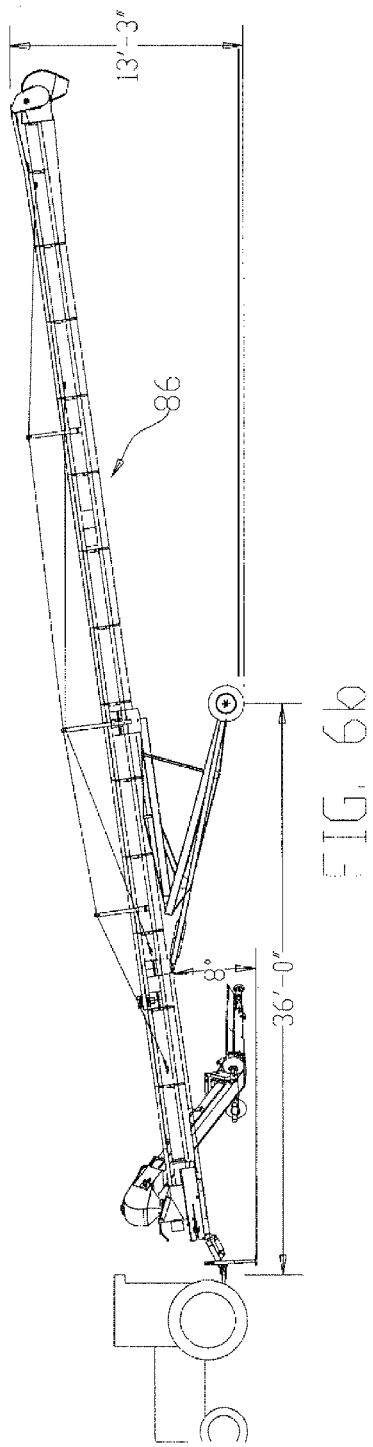

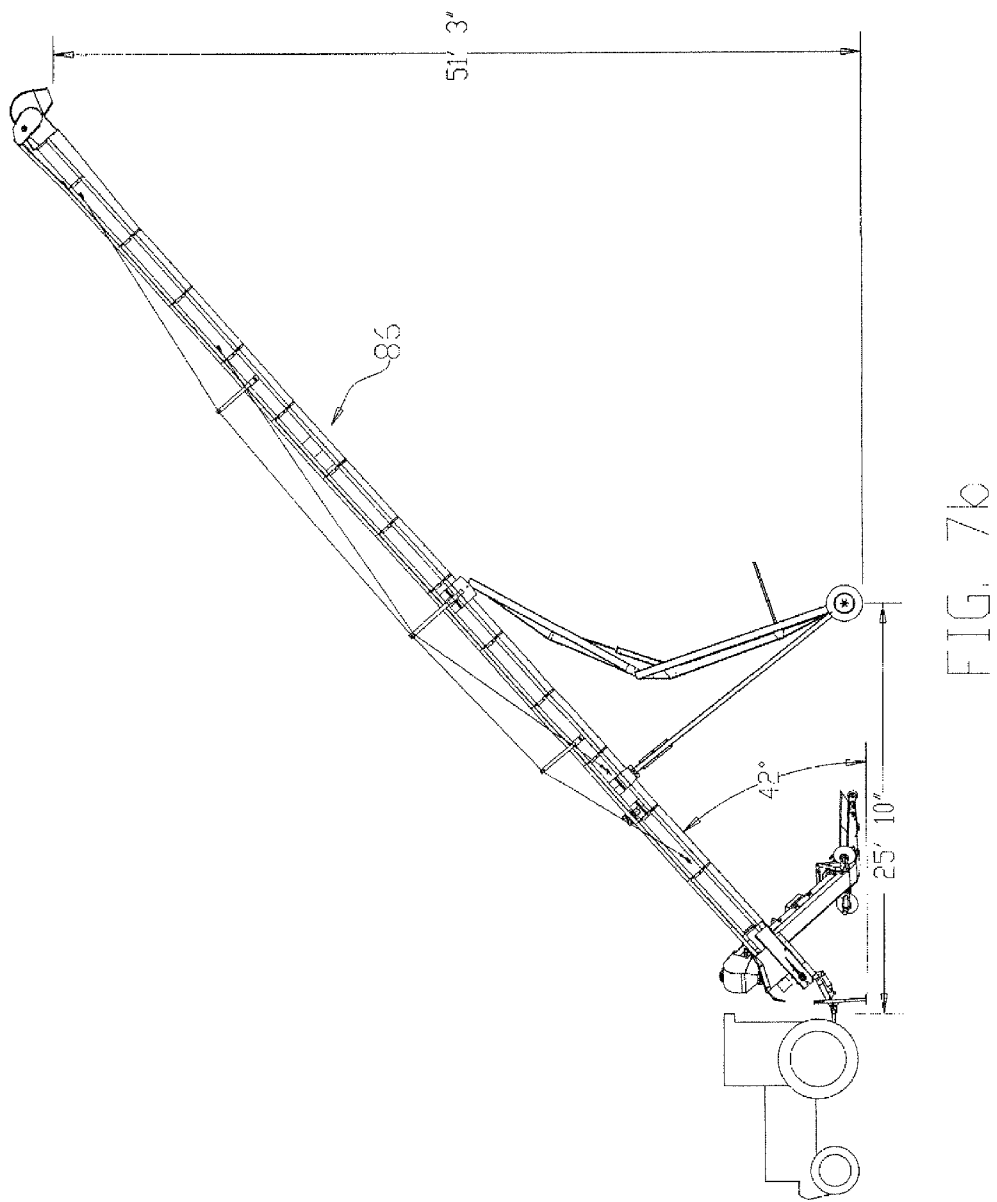

ADJUSTABLE HITCH DEVICE

FIELD OF THE INVENTION

This invention relates generally to an arrangement for towing an implement or a trailer by a vehicle, and is particularly directed to an adjustable hitch arrangement for changing the angle of elevation, or inclination, of the implement or trailer relative to the ground plane to an increased elevation angle for use during operation of the implement or trailer, or for reducing the implement's elevation angle for transport or storage of the implement or trailer.

BACKGROUND OF THE INVENTION

Grain such as wheat, shelled corn, oats and other granular materials are commonly transported from point to point by means of conveyors. The movement of the grain may be from a combine or a grain cart to a truck or a storage bin, or between storage bins. This grain movement typically involves elevating the grain from a lower portion of a first grain storage arrangement to an upper portion of a second grain storage arrangement. This is typically accomplished by means of a grain conveyor with a moving endless belt disposed within an elongated, tubular housing. The transport vehicles and storage bins are of various sizes and heights. Therefore, the upper discharge end of the grain conveyor must be capable of assuming a range of heights to accommodate various vehicle and storage bin sizes.

The conveyor's housing enclosing the moving endless belt is commonly supported by an adjustable frame of the scissors type connected to an intermediate portion of the tubular housing to raise and lower its upper discharge end. Another approach uses another type of adjustable frame slidably coupled to the elongated, tubular housing adjacent its discharge end. The adjustable frame is adapted for movement along the lower surface of the conveyor's tubular housing to change its angle of elevation and the height of its upper discharge end. These types of conveyor housing supports are typically rather complex, involving various moving parts, require a flat surface over substantially the entire length of the conveyor housing, and have a separate, independent power system for raising and lowering the conveyor's housing. In addition, the size and complexity of the conveyor housing support assembly restricts the compactness of the conveyor for transport and storage.

The present invention addresses the aforementioned limitations of the prior art by providing an adjustable hitch device for use with a towed implement or trailer which is capable of elevating the implement or trailer to increased heights, while also allowing the implement or trailer to assume a lower profile to facilitate implement transport and storage.

OBJECTS AND SUMMARY OF THE INVENTION

It is an object of the present invention to provide an adjustable hitch mechanism for towing a portable implement or a trailer which allows for increasing the angle of elevation of the implement/trailer for operation at increased heights, or decreasing the implement/trailer's angle of elevation to reduce its profile to facilitate transport and storage.

It is another object of the present invention to provide a hydraulic arrangement for towing a portable implement or trailer which allows for changing the implement/trailer's elevation angle for use in operation or for towing/storage of the implement/trailer, where the hydraulic arrangement is powered by either the implement/trailer's hydraulic system or by the hydraulic system of the towing vehicle in parallel.

Yet another object of the present invention is to provide a hydraulic towing arrangement which is adapted for use with an implement or a trailer, and is particularly adapted for use with a portable seed handling conveyor which allows for adjusting the elevation of the conveyor between increased elevation for use in operation in elevating and discharging seeds, and reduced elevation for transport and storage of the conveyor.

A still further object of the present invention is to provide an adjustable hydraulic towing arrangement adapted for use with a wide range of trailers and agricultural implements, and which is particularly adapted for use with seed handling conveyors for positioning the conveyor at an increased elevation angle for lifting the grain to greater heights during operation, or for reducing the conveyor's elevation angle while increasing the ground clearance of the adjustable towing arrangement to facilitate conveyor transport and storage.

For use in towing a portable grain conveyor having forward and aft portions and including a conveyor arrangement movable between an elevated position for use in conveying grain and a lowered position for transport and storage, the present invention contemplates an adjustable hitch comprising: a tongue attached to and extending rearwardly from a traction vehicle; a rigid arm having a forward portion pivotally coupled to the tongue and extending rearwardly from the traction vehicle, the rigid arm further including an aft portion pivotally coupled to the forward portion of the grain conveyor, wherein the rigid arm is free to pivot up and down in a generally vertical direction relative to the tongue and the grain conveyor; and a displacement member movable between extended and retracted configurations and having a forward portion pivotally coupled to an intermediate portion of the rigid arm and an aft portion pivotally coupled to the grain conveyor, wherein movement of the displacement member to the extended configuration lowers the forward portion of the grain conveyor and elevates the conveyor arrangement for use in conveying grain, and movement of the displacement member to the retracted configuration raises the forward portion of the main conveyor and lowers the conveyor arrangement for transport and storage.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 6a, 6b and 7a, 7b illustrate a comparison of the height of a portable grain conveyor incorporating the adjustable hitch device of the present invention and the height of a portable grain conveyor without the inventive adjustable hitch device in the full retracted configuration and in the full upraised configuration, respectively.

DETAILED DESCRIPTION OF THE PREFERRED EMBODIMENTS

Figure 1:
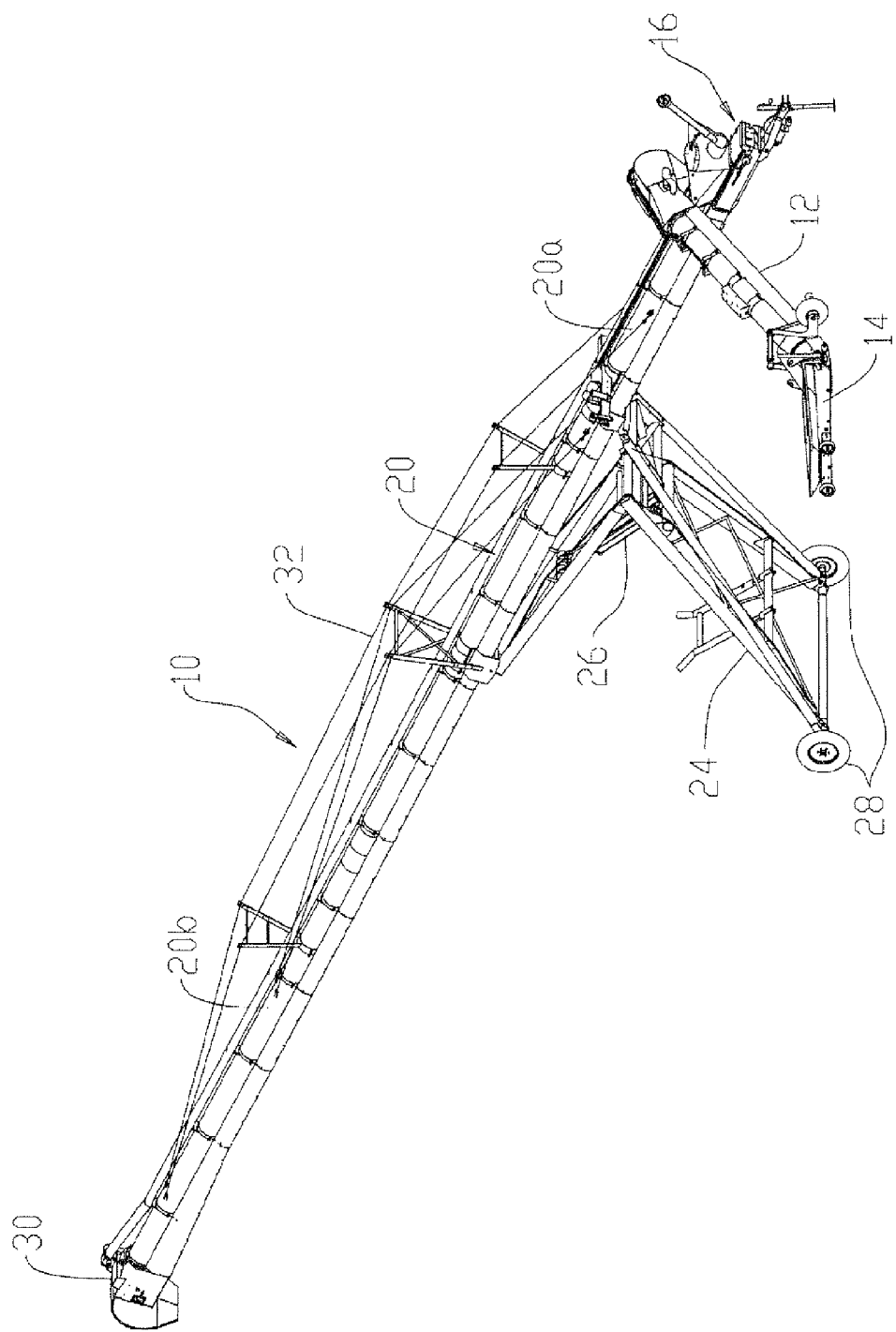
FIG. 1 is a perspective view of a portable grain conveyor particularly adapted for use with the adjustable hitch device of the present invention.

Referring to FIG. 1, there is shown a perspective view of a portable grain conveyor 10 in which the adjustable hitch device of the present invention is adapted for use. Portable grain conveyor 10 includes a secondary conveyor 12 having a grain hopper 14 attached to its lower end. Hopper 14 is adapted to receive grain which is provided to and transported upwardly by the secondary conveyor 12 to its upper end. The upper end of secondary conveyor 12 is disposed adjacent the inlet end 16 of the portable grain conveyor 10. The inlet end 16 of the portable grain conveyor 10 includes a second grain hopper 40 (shown in FIG. 2) adapted to receive the grain discharged from the upper end of the secondary conveyor 12. Attached to and extending upward from the portable grain conveyor's inlet end 16 is a primary conveyor 20 which includes a lower tubular housing 20a and an upper tubular housing 20b which are connected together in an end-to-end manner. An intermediate portion of the primary conveyor 20 is attached to and supported by a flexible support frame 24, also known as a "scissors" support frame. Incorporated within flexible support frame 24 is one or more hydraulic cylinders 26 movable between a retracted configuration and an extended configuration. With hydraulic cylinder 26 retracted, primary conveyor 20 is lowered to a substantially horizontal orientation for transport or storage of the portable grain conveyor 10. With hydraulic cylinder 26 extended, as shown in FIG. 1, primary conveyor 20 is oriented in the use position for operation in transporting grain upwardly and discharging the grain from its outlet discharge end 30. Attached to a lower portion of flexible support frame 24 are a pair of wheels 28 to facilitate transport of the portable grain conveyor 10. A similar pair of wheels is attached to a lower end of the secondary conveyor 12 to facilitate its positioning of the secondary conveyor. Guy wires, or cables, or solid trussing 32 extend substantially the length of the primary conveyor 20 to provide support for and alignment of its lower and upper housings 20a, 20b.

Each of the primary and secondary conveyors 20, 12 includes a respective endless belt (not shown) for transporting grain. In some cases, these endless belts may be provided with plural spaced cleats extending outwardly from the belt which allow these belts to transport increased amounts of grain at increased elevation angles of the two conveyor sections. In some cases, the conveyor angle of elevation may approach, and even exceed, 40°.

Figure 2:
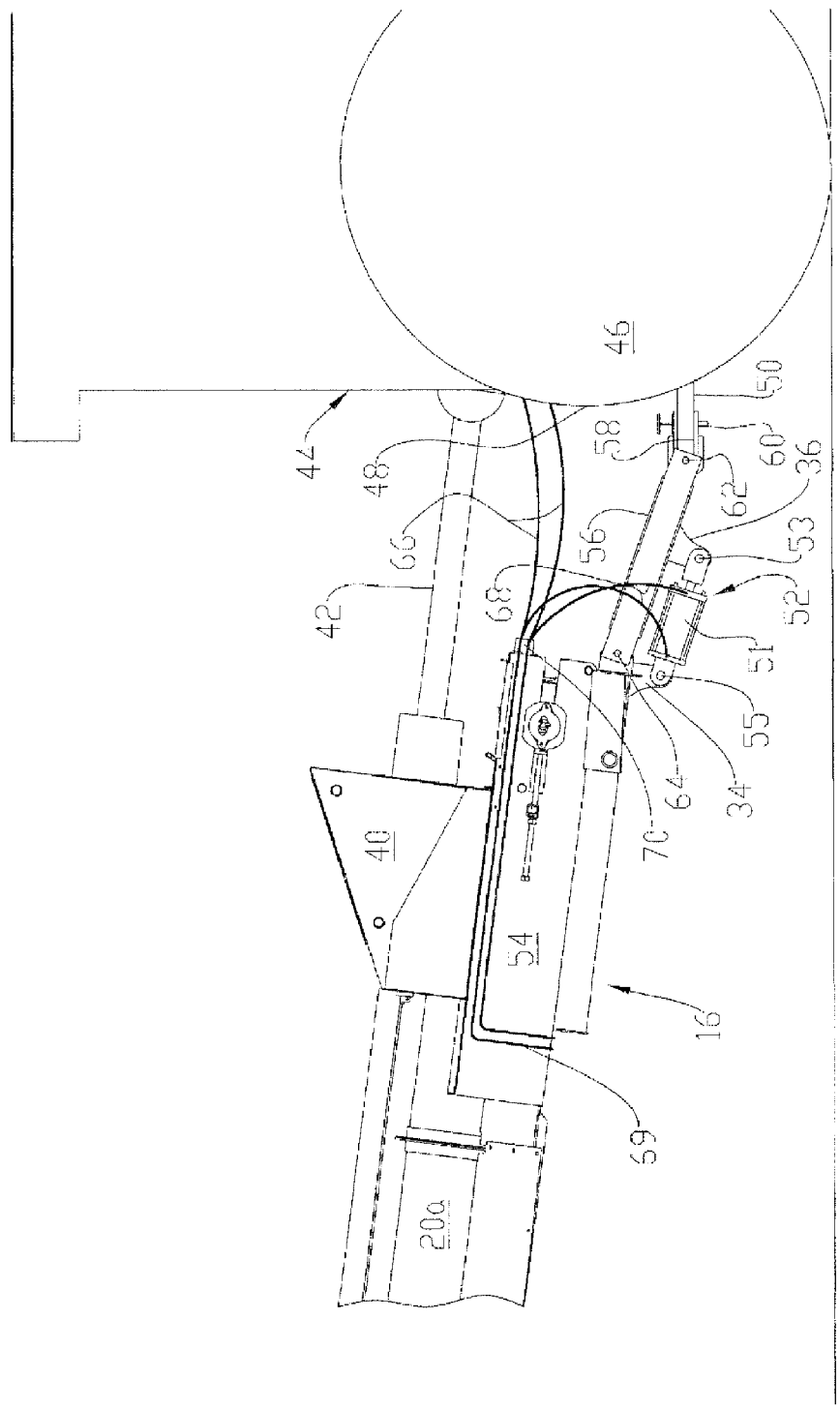
FIG. 2 is a side elevation view illustrating details of the installation of the adjustable hitch device in a portable grain conveyor in accordance with the present invention.

Referring to FIG. 2, there is shown a side elevation view of the inlet, or front, end 16 of a portable grain conveyor incorporating an adjustable hitch device 52 in accordance with the present invention. The inlet end 16 of the portable grain conveyor includes a conveyor coupling housing 54. Mounted to an upper portion of the conveyor coupling housing 54 is a second grain hopper 40 adapted to receive grain from the secondary conveyor, which is not shown in FIG. 2 for simplicity. Disposed on the distal end of lower tubular housing 20b is its outlet discharge end 30 described above and shown in FIG. 1. Attached to the second grain hopper 40 is a power take-off (PTO) drive shaft 42. PTO drive shaft 42 is coupled to the PTO output (not shown) of a traction vehicle, such as a tractor, 44 to which the inlet end 16 of the portable grain conveyor 10 is connected as described below. PTO drive shaft 42 is used to drive the endless belt which transports the grain within the primary conveyor 20.

Attached to an aft portion of a tractor 44 adjacent its rear drive wheels 46 is a mounting structure 48. Attached to mounting structure 48 and extending rearward therefrom is a connecting, or hitch, arrangement for securely coupling the portable grain conveyor's inlet end 16 to tractor 44. The hitch arrangement includes a tractor tongue 50 mounted to and extending rearwardly from the tractor's mounting structure 48. Pivotally attached to tractor tongue 50 by means of a coupling pin 60 is a coupling member 58. Coupling member 58 is free to pivot horizontally with respect to the tractor's tongue 50. Coupling member 58 is pivotally connected to a forward end of an elongated, rigid coupling arm 56 by means of a first forward pivot pin 62. Coupling arm 56 forms a part of the adjustable hitch device 52 of the present invention. An aft end of coupling arm 56 is pivotally coupled to a forward portion of the portable grain conveyor's inlet end 16 by means of a second aft pivot pin 64. By means of the first forward and second aft pivot pins 62, 64 coupling arm 56 is capable of undergoing vertical displacement with respect to tractor tongue 50 and the portable grain conveyor's coupler housing 54 which forms part of the portable grain conveyor's inlet end 16.

Adjustable hitch device 52 further includes a hydraulic cylinder 51. A first, rod end of hydraulic cylinder 51 is coupled to an intermediate portion of coupling arm 56 by means of a third forward pivot pin 53 inserted through a first bracket 36 attached to the coupling arm. A second, piston end of hydraulic cylinder 51 is coupled to a forward portion of the portable grain conveyor's coupler housing 54 by means of a fourth aft pivot pin 55 inserted through a second bracket 34 attached to the coupler housing. The aforementioned brackets 34, 36 may be attached to or formed integrally with the coupler housing 54 and coupling arm 56, respectively.

A first pair of hydraulic hoses 66 is connected between the hydraulic system of tractor 44 and a hydraulic manifold 70 attached to the portable grain conveyor's coupler housing 54. A second pair of hydraulic hoses 68 couples the hydraulic manifold 70 to the hydraulic cylinder 51 of the adjustable elevation hitch device 52. A third pair of hydraulic hoses 69 coupled to hydraulic manifold 70 provides hydraulic power to the one or more hydraulic cylinders 26 connected to the portable grain conveyor's flexible support frame 24 as shown in FIG. 1 and described above.

Figure 3:
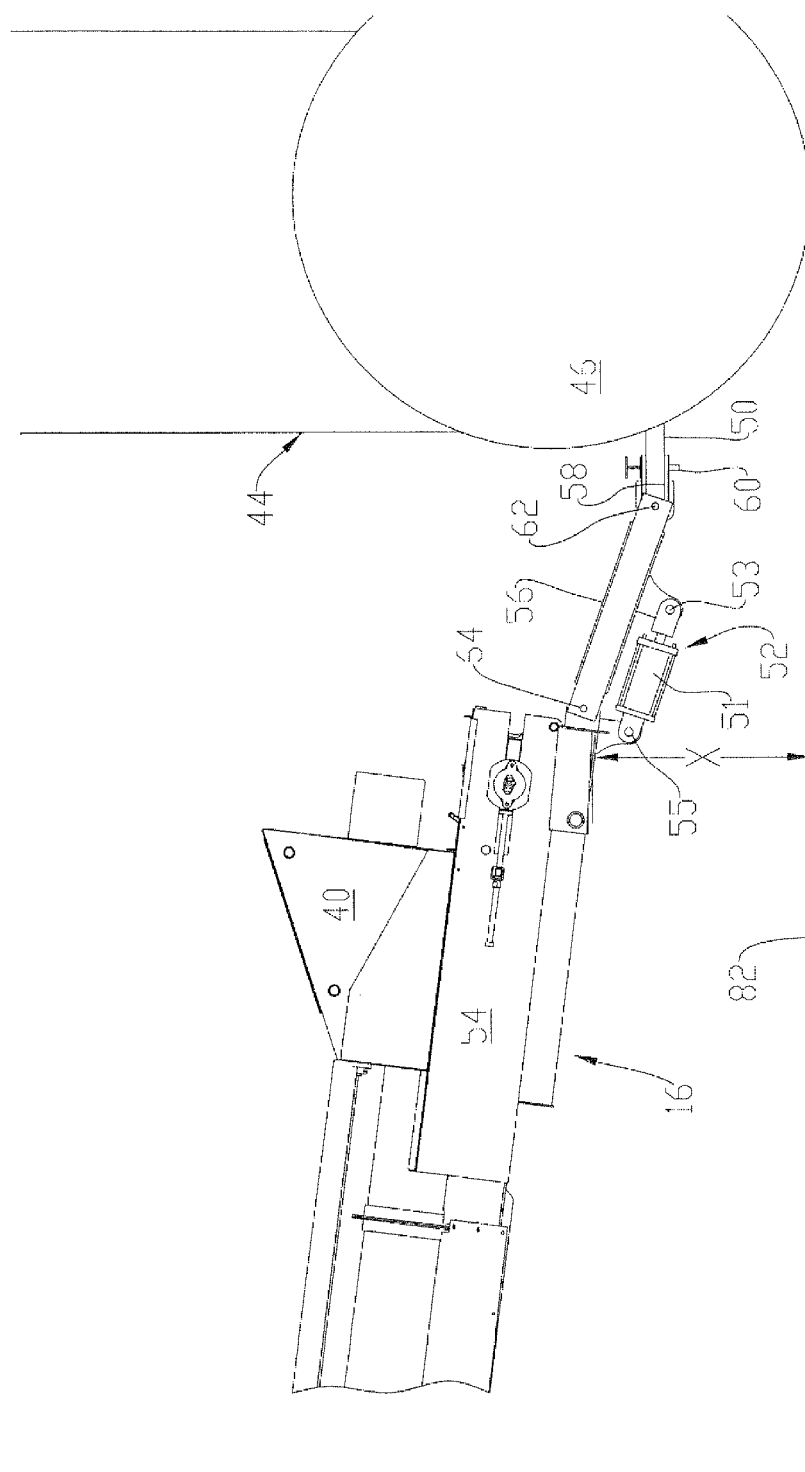
FIG. 3 is a side elevation view illustrating the adjustable hitch device in the upraised position for lowering the discharge end of the conveyor.
Figure 4:
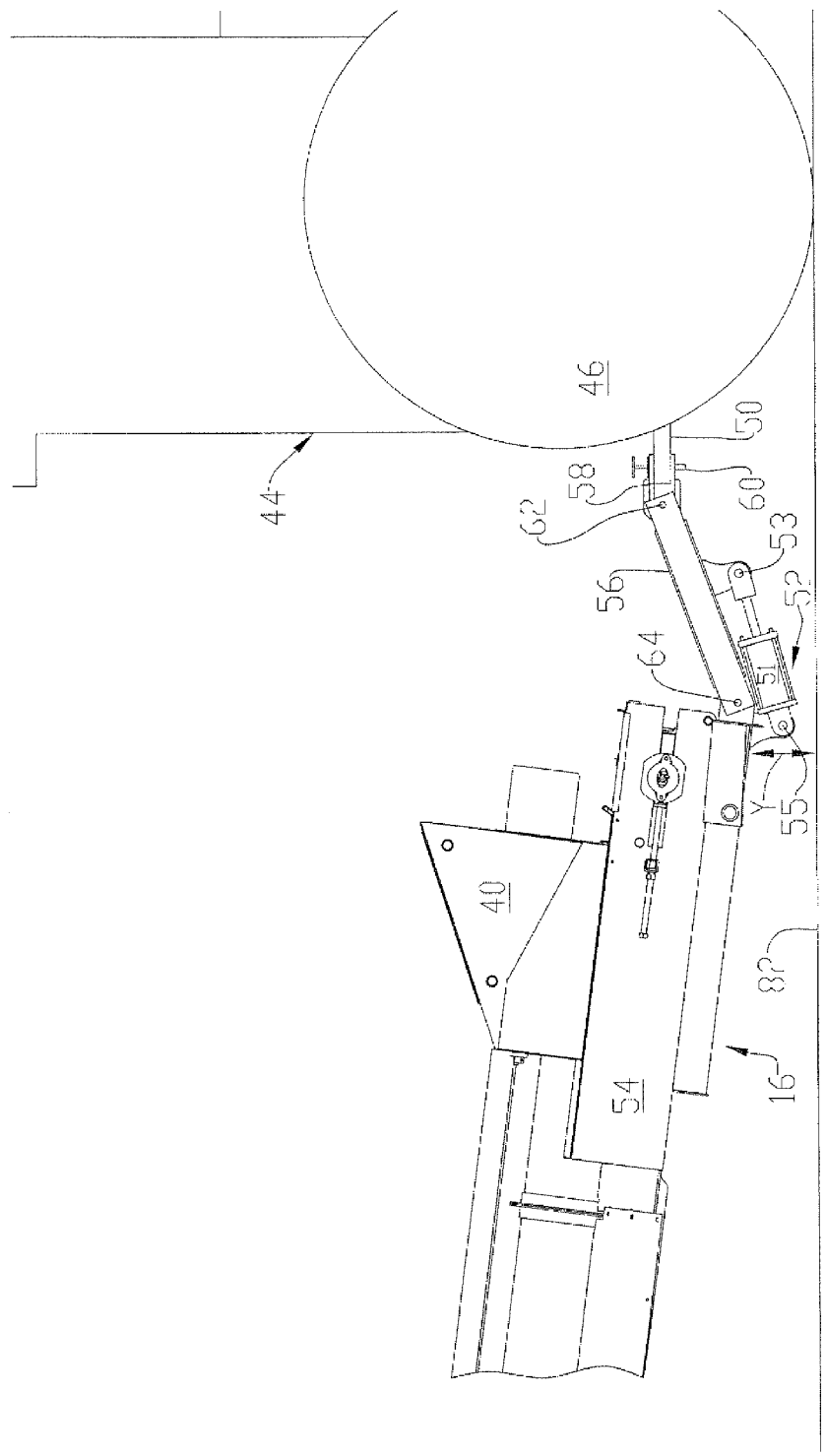
FIG. 4 is a side elevation view illustrating the adjustable hitch device in the lowered position for raising the discharge end of the conveyor.

The operation of the adjustable hitch device 52 of the present invention will now be described in terms of FIGS. 3 and 4. FIGS. 3 and 4 are side elevation views of the adjustable hitch device 52 respectively shown with its hydraulic cylinder 51 in the fully retracted position and in the fully extended position. With hydraulic cylinder 51 of the adjustable hitch device 52 in the fully retracted position as shown in FIG. 3, the bottom of the portable grain conveyor's coupler housing 54 is positioned a distance "X" above the ground 82. In this configuration, the portable grain conveyor's coupler housing 54 is disposed higher than tractor tongue 50 relative to the ground 82. In this configuration, coupling arm 56 extends upwardly in proceeding from tractor tongue 50 toward the portable grain conveyor's coupler housing 54.

With hydraulic cylinder 51 fully extended as shown in FIG. 4, the forward end portion of coupling arm 56 attached to the combination of tractor tongue 50 and coupling member 58 by means of pivot pin 62 has not changed its position when compared with its position shown in FIG. 3. However, the opposing, or aft, end of coupling arm 56 pivotally connected to the portable grain conveyor's coupler housing 54 has been displaced downwardly. With the portable grain conveyor's coupler housing 54 moved closer to the ground 82, such that the distance between the ground and the coupler housing is now "Y", where Y is <X, the lowering of the coupler housing results in a corresponding increase in the height above the ground of the opposing end of the portable grain conveyor 10 where the grain is discharged from the conveyor. This increase in height in the discharge end of the portable grain conveyor 10 can be as much as 9 feet for a portable grain conveyor on the order of 70 feet in length. Returning to the retracted position of hydraulic cylinder 51 as shown in FIG. 3, not only is the vertical height, or profile, of the portable grain conveyor reduced, but the distance between the ground 82 and the adjustable elevation hitch device 52 is increased over that shown in FIG. 4, to facilitate transport and storage of the portable grain conveyor.

Figure 5:
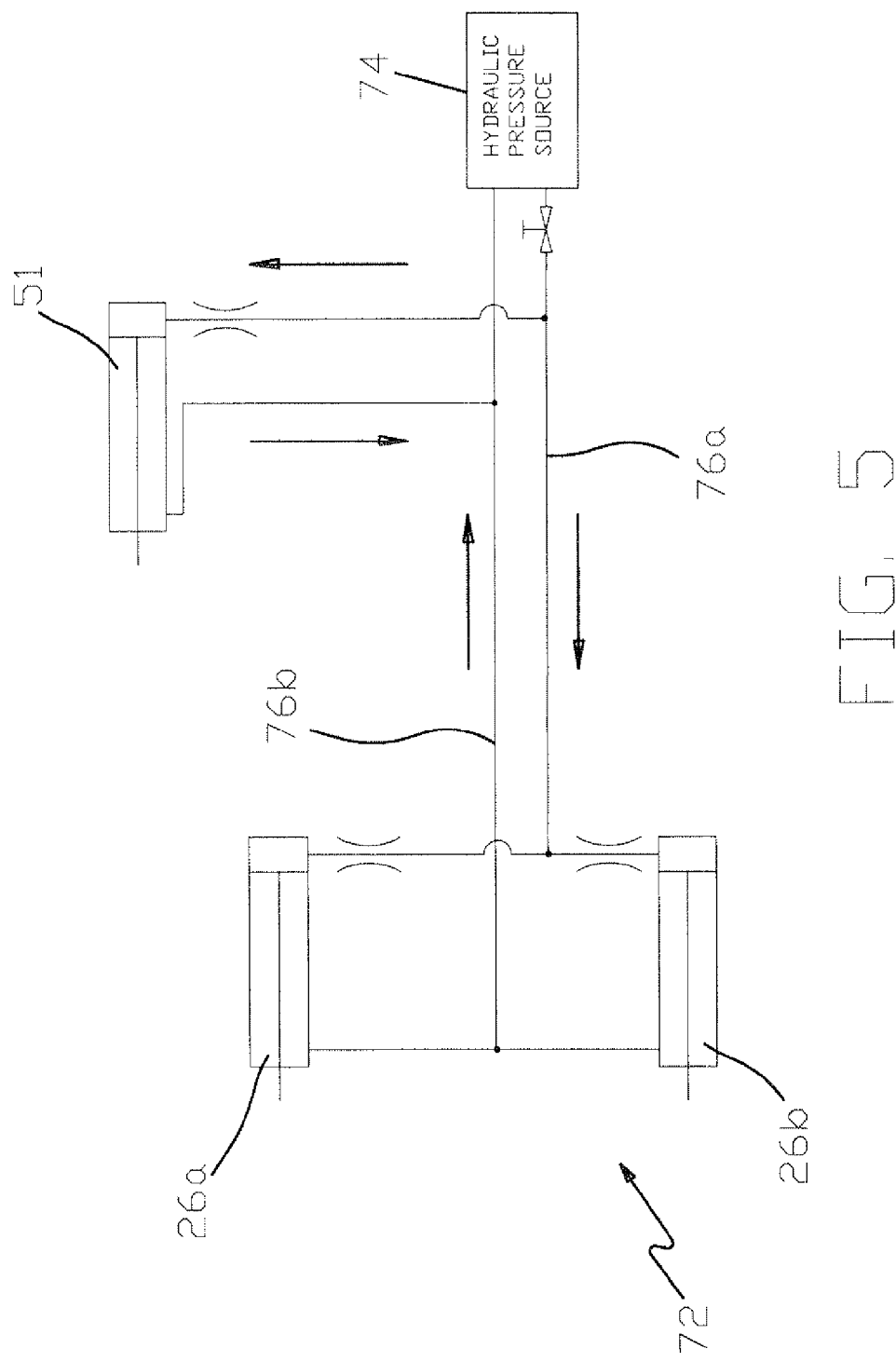
FIG. 5 is a simplified schematic diagram of a hydraulic system for controlling the operation of the adjustable hitch device of the present invention.

Referring to FIG. 5, there is shown a simplified schematic diagram of a hydraulic system 72 for operating the adjustable hitch device 52 of the present invention. Hydraulic system 72 includes a hydraulic pressure source 74 coupled to hydraulic hitch cylinder 51 and to first and second lift cylinders 26a and 26b. Hydraulic fluid under pressure is provided via a hydraulic input line 76a to the piston sides of the hydraulic hitch cylinder 51 and the first and second hydraulic lift cylinders 26a and 26b. In response to this hydraulic pressure, the rod of the hydraulic hitch cylinder 51 is moved to the extended position as shown in FIG. 4 for lowering the conveyor coupler housing 54, or the inlet end 16 of the portable grain conveyor 10. With the discharge end of the portable grain conveyor 10 in an elevated position, the hydraulic fluid is then provided to the respective piston sides of the first and second lift cylinders 26a and 26b to further elevate the discharge end of the portable grain conveyor to the fully upraised position. Upon removal of hydraulic fluid under pressure from the hydraulic lift and hitch cylinders, the three hydraulic cylinders retract and hydraulic fluid returns via a hydraulic return line 76b first from the rod ends of the first and second lift cylinders 26a, 26b and then from the rod side of the hydraulic lift cylinder 51 to the hydraulic pressure source 74. This results in retraction of the hydraulic lift cylinder 51, raising of the inlet end 16 of the portable grain conveyor 10, and lowering of the discharge end of the portable grain conveyor. Following retraction of the first and second lift cylinders 26a, 26b, hydraulic fluid under pressure is applied to the rod end of the hitch cylinder 51 causing retraction of the cylinder and raising of the conveyor's inlet end 16.

Figure 7A:
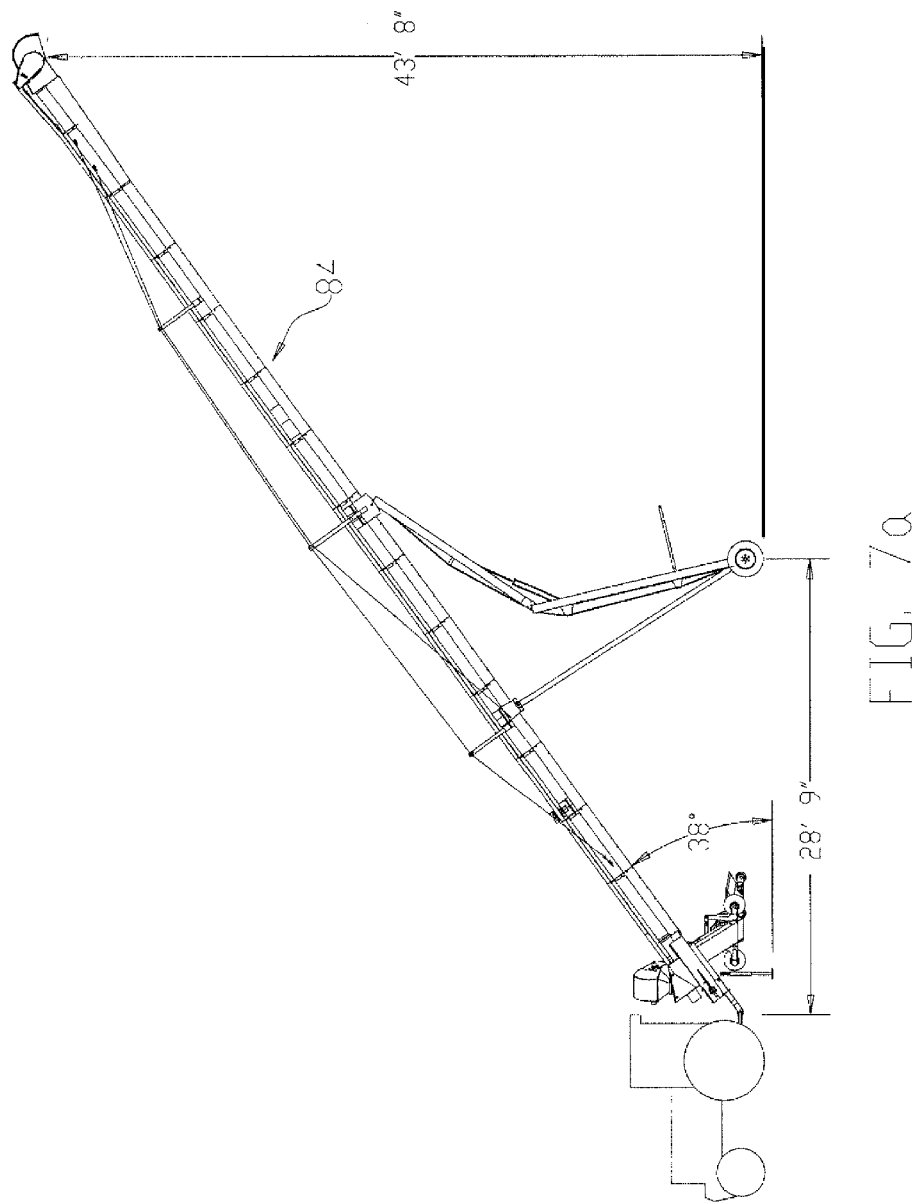

Referring to FIGS. 6a, 6b and FIGS. 7a, 7b there is shown a portable grain conveyor 84 without the inventive adjustable hitch device and a portable grain conveyor 86 incorporating the adjustable hitch device of the present invention in the full retracted configuration and in the full upraised configuration, respectively. As shown in FIGS. 6a and 6b, the portable grain conveyor 86 incorporating an adjustable hitch device in accordance with the present invention has the same profile as the conventional conveyor 84 shown in FIG. 6a, but the inventive conveyor shown in FIG. 6b provides more horizontal reach from the tires to the discharge end of the conveyor. By allowing the conveyor's transport wheels to be moved closer to the inlet end 16 of the portable grain conveyor 10, the conveyor's discharge end 30 can also be positioned at greater heights as shown in the figures. This feature also facilitates transport and storage of the portable grain conveyor 86 incorporating the invention as compared with the other portable grain conveyor 84. Thus, FIGS. 7a, 7b show that the portable grain conveyor 86 incorporating the inventive adjustable hitch device is capable of achieving higher elevations, by more than 7 feet, than the similarly configured portable grain conveyor 84 which does not include the adjustable hitch device of the present invention.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. For use in towing a portable grain conveyor having forward and aft portions and including a conveyor arrangement movable between an elevated position for use in conveying grain and a lowered position for transport and storage, an adjustable hitch comprising:
   a tongue attached to and extending rearwardly from a traction vehicle;
   a rigid arm having a forward portion pivotally coupled to said tongue and extending rearwardly from the traction vehicle, said rigid arm further including an aft portion pivotally coupled to the forward portion of said grain conveyor, wherein said rigid arm is free to pivot up and down in a generally vertical direction relative to said tongue and said grain conveyor; and
   a displacement member movable between extended and retracted configurations and having a forward portion pivotally coupled to an intermediate portion of said rigid arm and an aft portion pivotally coupled to said grain conveyor, wherein movement of said displacement member to said extended configuration lowers the forward portion of the grain conveyor and elevates the conveyor arrangement for use in conveying grain, and movement of said displacement member to said retracted configuration raises the forward portion of the grain conveyor and lowers the conveyor arrangement for transport and storage.

2. The adjustable hitch of claim 1, wherein said displacement member comprises a first hydraulic cylinder coupled to a source of hydraulic fluid under pressure and movable between said extended and retracted configurations.

3. The adjustable hitch of claim 2, wherein said first hydraulic cylinder includes an extendible rod coupled to the intermediate portion of said rigid arm and a piston portion coupled to the forward portion of the portable grain conveyor.

4. The adjustable hitch of claim 3, wherein the forward portion of the portable grain conveyor and the intermediate portion of said rigid arm respectively include first and second brackets coupled to the piston portion and to the extendible rod of said first hydraulic cylinder, respectively.

5. The adjustable hitch of claim 4, wherein said first and second brackets are attached to or formed integrally with the forward portion of the portable grain conveyor and an intermediate portion of said rigid arm, respectively.

6. The adjustable hitch of claim 2, wherein the traction vehicle includes a hydraulic system, and wherein said first hydraulic cylinder is coupled to and powered by the traction vehicle's hydraulic system.

7. The adjustable hitch of claim 2, wherein said grain conveyor further includes one or more second hydraulic cylinders coupled to the conveyor arrangement for raising and lowering the conveyor arrangement, and wherein said first hydraulic cylinder is hydraulically coupled in parallel to said one or more second hydraulic cylinders.

8. The adjustable hitch of claim 1 further comprising a coupling member attached to the forward portion of said rigid arm in a vertically pivoting manner and attached to said tongue to in a horizontally pivoting manner.

9. The adjustable hitch of claim 1, wherein said conveyor arrangement includes a grain inlet end disposed in the forward portion of the portable grain conveyor and a grain discharge end disposed in the aft portion of the portable grain conveyor, and wherein said portable grain conveyor includes a foldable support structure coupled to an intermediate portion of the conveyor arrangement for raising and lowering the conveyor arrangement.

10. For use in towing an implement using a traction vehicle, wherein said implement includes first and second spaced, opposed portions, an adjustable hitch comprising:

a tongue mounted to the traction vehicle;

an elongated rigid arm having a forward portion pivotally coupled to said tongue and extending rearwardly from the traction vehicle, said elongated rigid arm further including an aft portion pivotally coupled to the first portion of the implement, wherein said arm is free to pivot up and down in a generally vertical direction relative to said tongue and said implement; and a displacing member movable between first and second configurations and having a front portion pivotally coupled to said arm and a rear portion pivotally coupled to the first portion of the implement, wherein when said displacing member moves from said first configuration to said second configuration the first portion of said implement is lowered and the second, opposed portion of said implement is elevated, and when said displacing member moves from said second configuration to said first configuration the first portion of said implement is elevated and the second, opposed portion of said implement is lowered.

\* \* \* \* \*